(12) United States Patent
Gardiner et al.

(10) Patent No.: US 7,561,155 B1
(45) Date of Patent: Jul. 14, 2009

(54) METHOD FOR REDUCING TRANSPORT DELAY IN AN IMAGE GENERATOR

(75) Inventors: Dee Gardiner, Sandy, UT (US); Bob Grange, Centerville, UT (US); Richard Moon, Salt Lake City, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 1982 days.

(21) Appl. No.: 09/694,411

(22) Filed: Oct. 23, 2000

(51) Int. Cl.
*G06T 17/00* (2006.01)
*G09G 5/36* (2006.01)

(52) U.S. Cl. .................................. 345/420; 345/545

(58) Field of Classification Search ......... 345/418–424, 345/427, 539, 544, 545
See application file for complete search history.

(56) References Cited

U.S. PATENT DOCUMENTS

| | | | | |
|---|---|---|---|---|
| 5,371,513 A * | 12/1994 | Drako et al. | ............... | 345/620 |
| 5,444,839 A * | 8/1995 | Silverbrook et al. | ........ | 345/441 |
| 5,451,981 A * | 9/1995 | Drako et al. | ............... | 345/620 |
| 5,526,024 A * | 6/1996 | Gaglianello et al. | ......... | 345/547 |
| 5,543,824 A * | 8/1996 | Priem et al. | ................. | 345/539 |
| 5,617,113 A * | 4/1997 | Prince | ........................ | 345/103 |
| 5,623,527 A * | 4/1997 | Scott | .......................... | 377/72 |
| 5,696,944 A * | 12/1997 | Krech, Jr. | ................... | 345/539 |
| 5,720,019 A * | 2/1998 | Koss et al. | ................... | 345/620 |
| 5,742,788 A * | 4/1998 | Priem et al. | ................. | 711/110 |
| 5,784,075 A * | 7/1998 | Krech, Jr. | ................... | 345/553 |
| 5,864,342 A * | 1/1999 | Kajiya et al. | ............... | 345/418 |
| 5,886,701 A * | 3/1999 | Chauvin et al. | ............. | 345/418 |
| 6,043,811 A * | 3/2000 | Kato et al. | ................... | 345/632 |
| 6,100,906 A * | 8/2000 | Asaro et al. | ................. | 345/539 |
| 6,229,553 B1 * | 5/2001 | Duluk et al. | ................ | 345/506 |
| 6,268,875 B1 * | 7/2001 | Duluk et al. | ................ | 345/506 |
| 6,316,974 B1 * | 11/2001 | Taraci et al. | ................ | 327/147 |
| 6,317,133 B1 * | 11/2001 | Root et al. | ................... | 345/503 |
| 6,326,964 B1 * | 12/2001 | Snyder et al. | .............. | 345/419 |
| 6,344,852 B1 * | 2/2002 | Zhu et al. | ................... | 345/418 |

(Continued)

OTHER PUBLICATIONS

Bishop, Fuchs, McMillan and Zagier, "Frameless Rendering: Double Buffering Considered Harmful," Computer Graphics Proceedings, Annual Conference Series, 1994.

(Continued)

*Primary Examiner*—Kee M Tung
*Assistant Examiner*—Roberta Prendergast
(74) *Attorney, Agent, or Firm*—Thorpe North & Western LLP

(57) ABSTRACT

A method for reducing the transport delay in a computer image generator. The first step is dividing a single frame buffer into a plurality of screen bins. Next is storing primitives in each screen bin the primitives touch. Then the screen bins are rendered by row from top to bottom. Finally, at least one rendered screen bin is displayed from the single frame buffer before the rendering of all the screen bins has completed for the frame buffer. Preferably the step of displaying of the screen bins rendered should be started when the rendering is at least ½ completed. In some cases, the step of displaying of the screen bins rendered can be started after at least one row of screen bins has completed rendering. A hardware interlock can be used to ensure that the rendering process does not advance past the display process.

13 Claims, 10 Drawing Sheets

U.S. PATENT DOCUMENTS

| | | | |
|---|---|---|---|
| 6,380,935 B1 * | 4/2002 | Heeschen et al. | 345/423 |
| 6,407,736 B1 * | 6/2002 | Regan | 345/422 |
| 6,437,779 B1 * | 8/2002 | Saito et al. | 345/420 |
| 6,441,658 B1 * | 8/2002 | Taraci et al. | 327/147 |
| 6,441,819 B1 * | 8/2002 | Suzuoki | 345/420 |
| 6,801,205 B2 * | 10/2004 | Gardiner et al. | 345/539 |
| 6,853,381 B1 * | 2/2005 | Grigor et al. | 345/531 |

OTHER PUBLICATIONS

Regan and Pose, "Priority Rendering with a Virtual Reality Address Recalculation Pipeline," Computer Graphics Proceedings, Annual Conference Series, 1994.

Torborg and Kajiya, "Talisman: Commodity Realtime 3D Graphics for the PC," Computer Graphics Proceedings, Annual Conference Series, 1996.

* cited by examiner

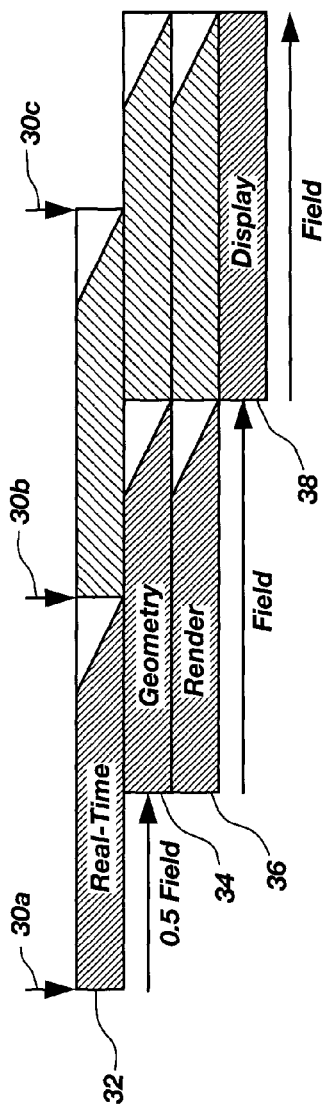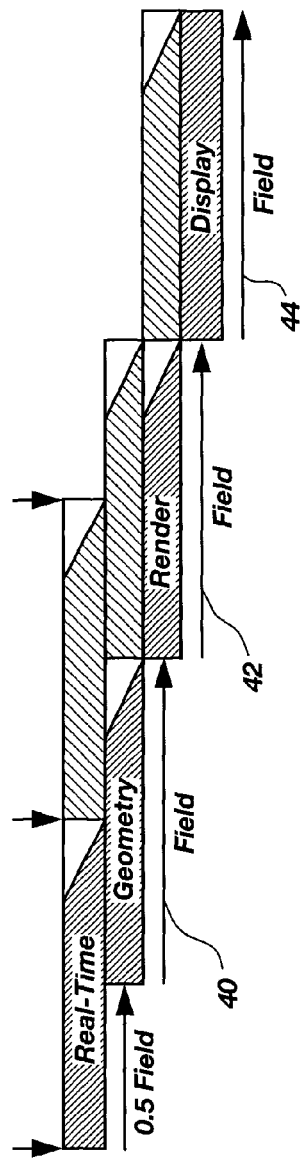
Fig. 3 (PRIOR ART)
Fig. 4 (PRIOR ART)

METHOD FOR REDUCING TRANSPORT DELAY IN AN IMAGE GENERATOR

TECHNICAL FIELD

The present invention relates generally to computer graphics and virtual image generation. More particularly, the present invention relates to a method for reducing transport delay in a graphics image generator for real-time simulators.

BACKGROUND ART

For many years image generators have been a key component of simulation devices used to train operators such as airline pilots. The value of the training experience is highly dependent on the realism of the simulation. One aspect of simulation devices that has received much attention over the years is transport delay, or latency. Transport delay is defined as the time for a stimulus, such as the pilot moving the control stick, until the last pixel on the screen has been drawn 24, as shown in FIG. 1.

Many training simulators have a house sync 20 that is used to synchronize all of the simulation hardware. Each time the vehicle host computer receives a sync pulse, it will sample the current position of the controls and switches and compute the behavior of the vehicle. Upon completion, the updated positional information will be sent to the image generators so the display image can be updated. The time it takes to actually sample the controls and switches and then send this information to the image generator is the host delay 22. The image generator also has a display sync 26 which times and regulates the image generator functions.

One important area of delay is the delay of the image generator. The image generator's portion of this delay is defined as the time from when the image generator receives a position update from the host computer until the last pixel is drawn on a visual display which represents the new position 28.

Two aspects of transport delay are critical to training. The first aspect is determinism, or repeatable delay. The second important aspect is the length of the transport delay. If the transport delay does not remain constant, or if the delay is too long, the operator will often be overcome with simulator sickness.

There are two basic architectures in use today for simulation visual systems. One architecture provides a shorter transport delay than the other, but it is substantially more expensive and less deterministic than the other approach. Typical workstation visual systems consist of the major processes, as shown in FIG. 2A. A simulator host computer sends an eye position update to the image generator. The visual system has a real-time controller which receives this update and computes the transformation matrices and other parameters necessary to render an image from the new current position 10. Those transformation matrices are then applied to all of the potentially visible primitives (polygons, lines, dots, etc.) in the simulation database 12. Once transformed into screen space the primitives are loaded into the FIFO queue 13. Then the primitives can be rendered 14 into a pixel frame buffer memory 15, and displayed on the pilot's view screen 16.

This first basic architecture is a standard three-dimensional (3D) graphics computer or a workstation system which can be used to perform these operations. With such an architecture, the visual system's transport delay is illustrated in FIG. 3. The vertical arrows 30a, 30b, 30c represent the transfer of positional information from the host computer to the image generator. The dark shaded boxes represent the flow of one field of data through the graphics pipeline. The box indicates the amount of time allocated for each process, while the shaded portion indicates when the process is active. Usually the process will complete before the allocated time is up, indicated by the sloped right edge of the shaded portion. If the process takes longer than the available time, the system will be in an overload condition. The lighter shaded boxes show how adjacent fields are processed back to back.

The simulation host computer sends positional update information 30a-30c to the image generator once each display field. The real-time controller then computes the matrices and other information needed to display the scene 32. The real-time calculations begin as soon as the system receives input from the host (the black down arrow 30a). The real-time controller computes the eye position matrices, computes the position and orientation of moving models, updates embedded system behaviors, and then begins processing the database. This computation usually takes about ½ of a field time. The amount of time needed for this computation is dependent on the database, the current eye position, and the number of complex auxiliary functions and behaviors.

The geometry processing then begins on the primitives in the scene 34. As each primitive is transformed, it is handed to the rendering hardware 36. Specifically, the geometry processing begins storing processed polygons in its output FIFO queue as quickly as possible. Once the FIFOs contain data, the rendering engine can begin processing those primitives. As pixels are produced by the rendering engine, they are stored in a double buffered pixel memory while the previous field's data is being sent to the display for screen refresh. One full field time is allocated for this process, but it is important to complete both processes before the end of the field time or the system will be in an overload condition. Once the new image has been completed and written into one side of a double buffered pixel frame buffer, the buffer will be ready to toggle, or swap, at the next vertical sync pulse. After toggling, the new image is presented to the display device 38. Thus, the total transport delay for the visual system is 2.5 fields. As mentioned, standard image generator transport delay is measured from the input of host data (the down arrow 30a) to the display of the very last pixel on the screen (the right edge of the darkened display box 38).

Unfortunately, this approach has drawbacks that make it difficult to maintain deterministic behavior. Primitives cannot be rendered until after the geometric transformation operations are performed. The time required to find primitives and transform them is highly dependent on the database structure and the current position within the database. The time required to render primitives is directly related to their size on the screen. It seldom occurs that the geometry and rendering processes require the same amount of time, so one process usually ends up waiting for the other. This means that either the geometry engine or the rendering engine will sit idle during some portion of the field which reduces the efficiency of the system. Specifically, the FIFO between the geometry process and the rendering process cannot always guarantee optimum performance. If the rendering engine receives many small polygons, the FIFO may be drained faster than the geometry process can generate new polygons. This can cause the rendering process to be starved, and waste valuable rendering time. On the other hand, the rendering process may run too slowly on very large polygons, causing the FIFOs to fill up and the geometry process to stall. Furthermore, this loss of efficiency will often cause the system to overload since the entire job cannot be completed on time. The interactions between the geometry process and rendering process make load management more difficult since it is difficult to isolate which process is causing the overload condition. As a result, many systems need more geometry and rendering hardware than was originally expected, which increases the cost of the overall system. This non-deterministic characteristic makes this architecture less than an optimum choice for simulation applications. The efficiency of this system can be improved by using very large FIFOs and delaying the rendering operation until the FIFOs are sufficiently filled by the geometry operations to prevent the rendering process from running dry. This improves the efficiency, but unfortunately increases the transport delay.

Referring now to FIG. 2B, a second basic architecture has been used for many years in systems that are designed specifically for simulation. Another doubled buffered memory 18 (in addition to the double buffered pixel frame buffer) is inserted between the geometry and rendering processes to completely isolate them from each other. This memory stores primitives and is referred to as the geometry buffer. This gives one full field time for geometry calculations 40 and the next field time for pixel rendering 42 as illustrated in FIG. 4. Then the rendered image is displayed in the final field time 44. Of course, the processes are pipelined so each process is operating on something every frame and a new image is created each and every frame. The downside of this approach is obviously the increased transport delay caused by this additional buffer. As illustrated in FIG. 4, the transport time with this system is 3.5 fields.

This prior art process can also be illustrated in a flow diagram format, as shown in FIG. 5. The simulation host computer sends positional update information to the image generator 60 once each house sync (which is the same time interval as the display field time). The real-time controller then computes the matrices 62 and other information needed to display the scene. This computation usually takes about ½ of a field time 64. The geometry processing then begins 66 on the primitives in the scene. After all primitives have been transformed 68 and the previous field has been rendered 70 and the field timer is done 72, the geometry buffer is toggled 74 and primitives are handed to the rendering hardware 76. One full field time is allocated for each of these processes. Once the new image has been rendered and written into one side of a double buffered pixel frame buffer 78, the buffer will be ready to toggle, or swap, at the next vertical sync pulse 80. After toggling 82, the new image is presented to the display device 84.

The flow diagram of FIG. 5 follows one host input or house sync through the graphics pipeline. It should be noted that all processes actually occur every field time since a new input is received for each field time. Under normal operating conditions, the geometry process, the rendering process, and the display process (and thus the vertical sync pulse) all start at the same time. Furthermore, the geometry buffer and the pixel frame buffer toggle just prior to starting these processes.

SUMMARY

It has been recognized that it would be advantageous to develop a simulation system that reduces the transport delay in a cost effective image generator architecture.

The invention provides a method for enabling a single pixel frame buffer for simultaneous rendering and display in a computer image generator. The first step is dividing a geometry buffer into a plurality of screen bins. Next, primitives are stored in each screen bin containing a portion of the primitive. Then the screen bins are rendered by row from top to bottom. The last step is displaying at least one rendered screen bin before the rendering of all the screen bins has completed for the single pixel frame buffer.

In accordance with one aspect of the present invention, the system includes the additional step of initiating the displaying of the screen bins rendered when the rendering is about ½ completed.

In accordance with another aspect of the present invention, the system is an image generator with a single pixel frame buffer enabled for simultaneous rendering and display. The system comprises a geometry buffer divided into a plurality of screen bins. A plurality of primitives are stored in all of the screen bins that touch a screen region defined by the screen bin. A rendering engine is configured to render the screen bins by row from top to bottom, into the pixel frame buffer. A display processor is configured to display at least one screen bin rendered before the rendering of all the screen bins has completed.

Additional features and advantages of the invention will be set forth in the detailed description which follows, taken in conjunction with the accompanying drawing, which together illustrate by way of example, the features of the invention.

BRIEF DESCRIPTION OF THE DRAWINGS

FIG. 3 illustrates a time line of the transport delay in a workstation graphics architecture;

FIG. 4 illustrates a time line of the transport delay in an image generator architecture;

DETAILED DESCRIPTION

Figure 1:
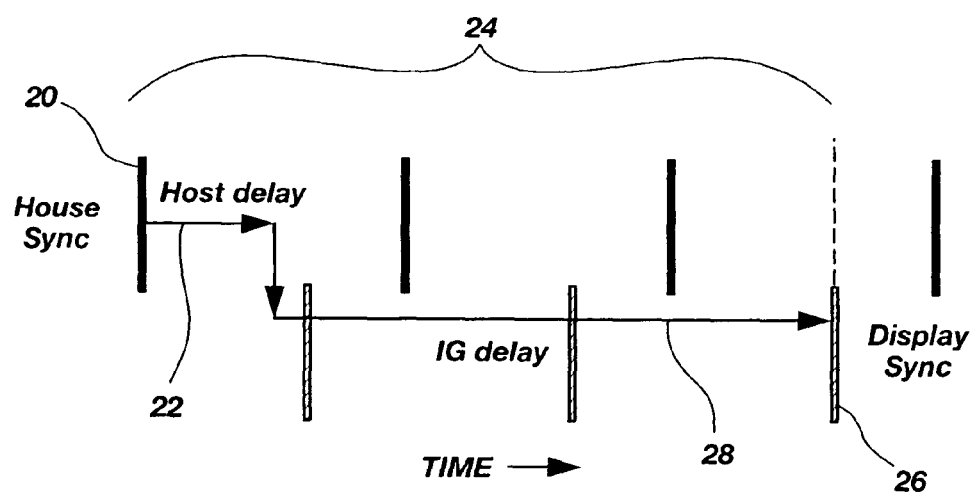
FIG. 1 is a time line diagram of house sync signals with respect to display sync signals and the length of system transport delay.
Figure 2A:
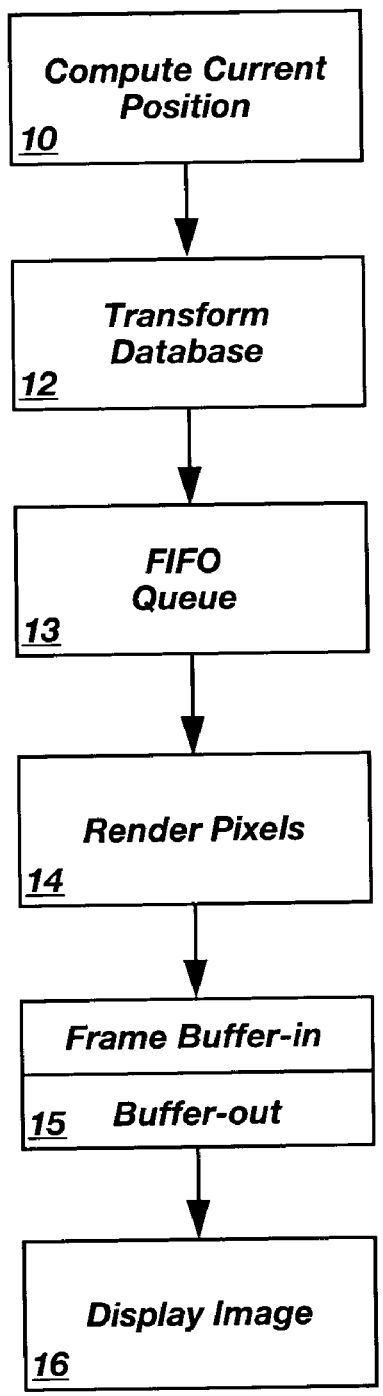
FIG. 2A is a flow chart illustrating the major processes in a workstation graphics system.
Figure 2B:
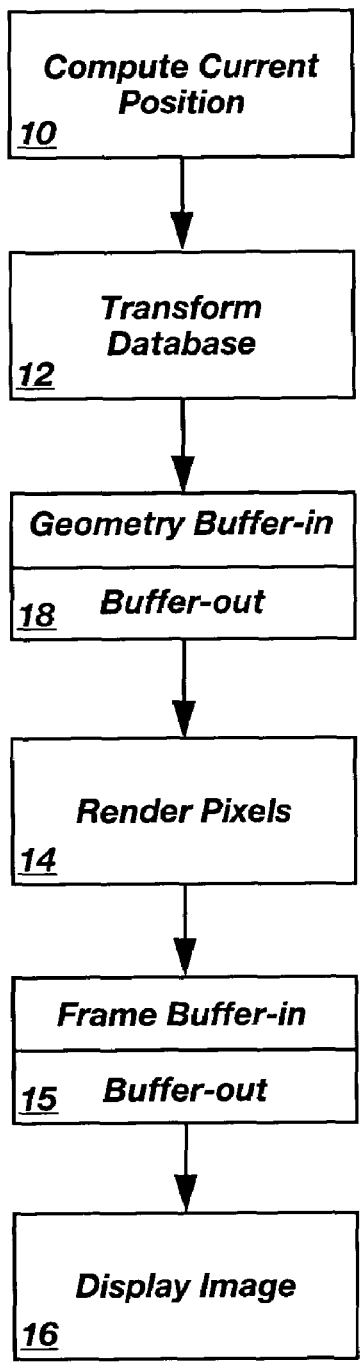
FIG. 2B is a flow chart illustrating the major processes in an image generator.
Figure 5:
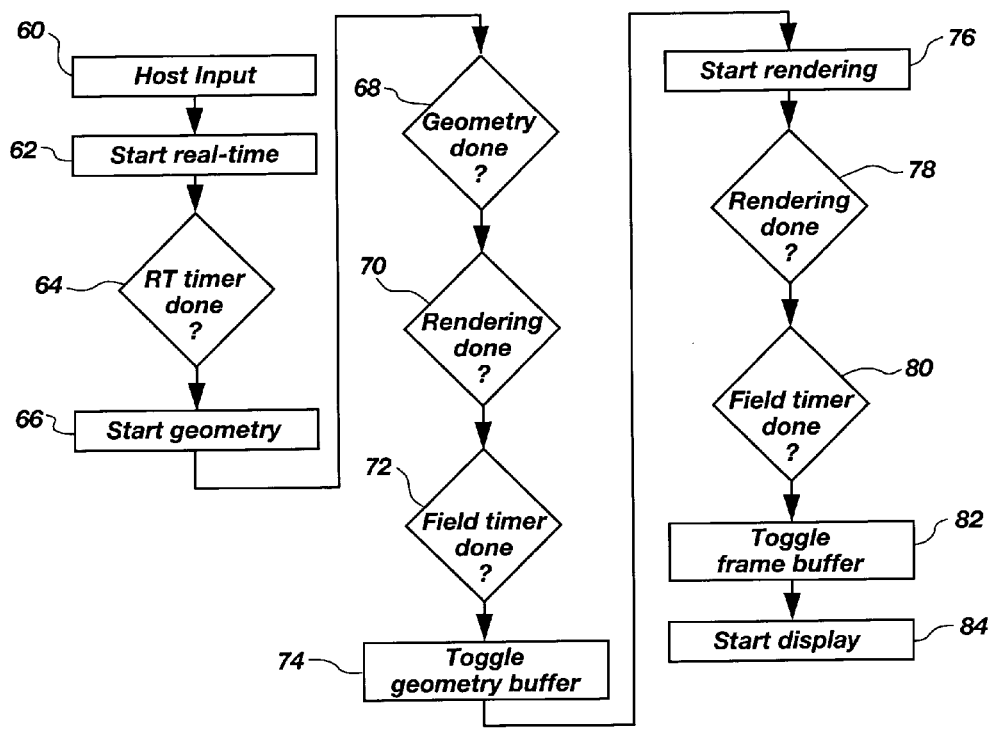
FIG. 5 illustrates a detailed flow diagram of the processes used for image generation as in FIG. 4.

For the purposes of promoting an understanding of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The present device provides a means to improve the transport delay in an image generation system that uses a geometry buffer between the geometry and rendering processes. The invention maintains the performance efficiency advantages of an image generation system while reducing the total latency or transport delay.

Figure 6:
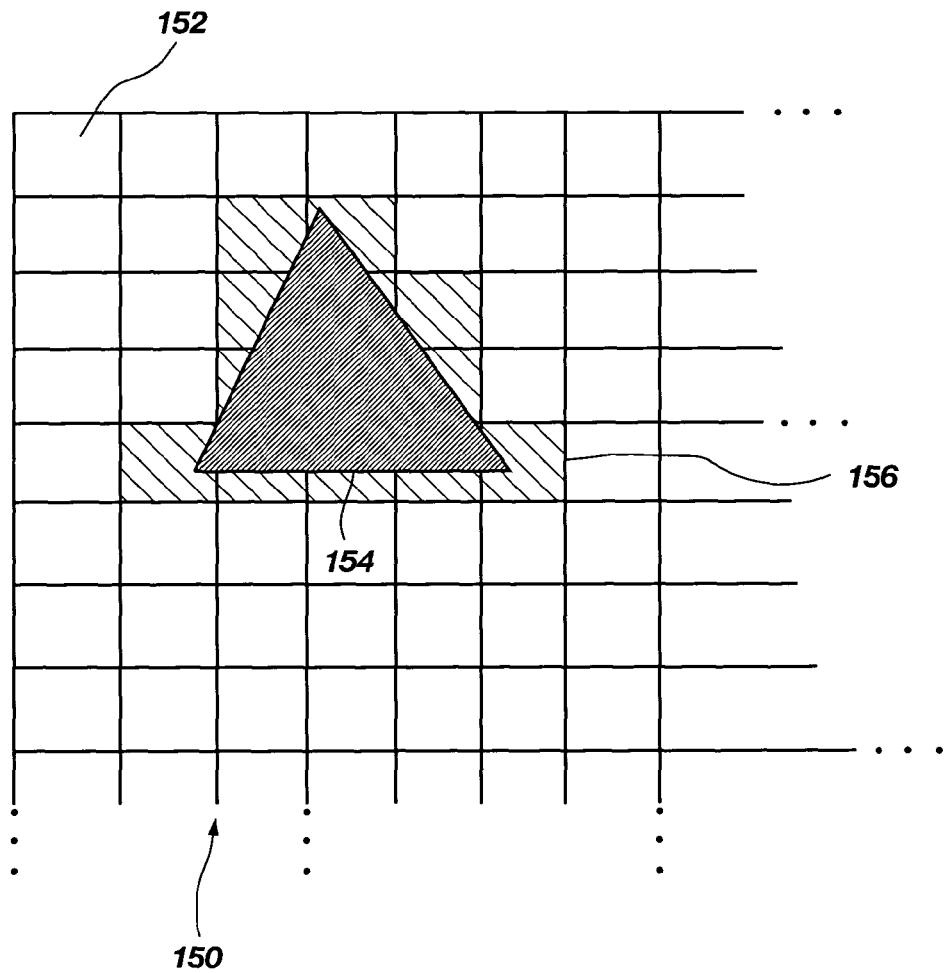
FIG. 6 illustrates a primitive entered into each of the screen bins it touches.

Rather than simply storing a list of transformed primitives in the geometry buffer, the new approach sorts the primitives into special bins or screen bins. Referring to FIG. 6, the display screen 150 or display area is subdivided into a regular array of screen bins 152. There is memory allocated to each screen bin in order to store the primitives 154 touching that region of the screen. In a practical application of the device, the screen may have 1,000-2,000 pixels in height and width or more. Thus, the screen bins can be 32 pixels by 32 pixels. It should also be realized that the screen bins can be sized to contain a larger or smaller number of pixels based on the overall performance of the system. As each primitive is presented to the geometry buffer from the geometry process, it is stored in all of the screen bins that the primitive touches 156. This continues until all of the primitives have been sorted into the appropriate bins in the geometry buffer.

Once the geometry buffer between the geometry and rendering processes toggles, the bins can be rendered sequentially. By defining the sequence appropriately, the scene can be rendered by row in top to bottom order. Once the top row of bins has been rendered into the pixel frame buffer, they can be displayed. It is important to point out that at least one row of bins must be rendered before the display process can begin. This is because the display process scans row by row starting with the first row. Whereas, the present rendering process must render every pixel in a screen bin before moving to the next bin. This configuration allows the system to begin displaying the top of the screen while the rendering engine is still rendering the bottom of the screen. However, care must be taken to insure that the rendering process and the display process do not interfere with each other. The display process proceeds at a very constant and predictable rate, while the rendering process time is a function of the number and size of the primitives in each bin.

Conventional graphics systems cannot exploit this technique because they render primitives in the order they are produced by the geometry operation. This means that the screen is being processed in a very random manner. One primitive may lie at the top of the screen while the next lies near the bottom. There is no guaranteed order to the pixel processing steps.

Figure 7:
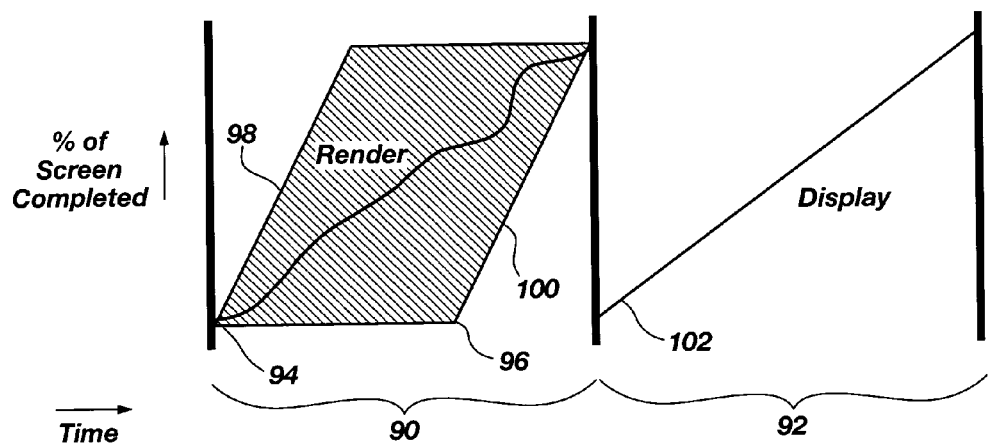
FIG. 7 illustrates a timing diagram of the rendering and display processes.

FIG. 7 illustrates the time sequence of the rendering phase 90 and the display phase 92. The black wavy line 94 indicates that the rendering operation is not a linear process. The amount of time required to render each screen bin is a function of the complexity of the scene within the bin. By rendering the screen bins top to bottom by row, the line represents how far down the screen the rendering process has completed versus the time that has passed (the bottom of the graph is 0% while the top of the graph is 100%). During the next field time 92, the rendered pixels are displayed. In contrast, the display process 102 is a linear process which proceeds down the screen at a well-defined rate that cannot be interrupted.

While the wavy render line represents one possible example of a rendering process, the shaded envelope 96 indicates the region to which the rendering process is confined. The slope of the left edge 98 is determined by the peak rendering performance of the rendering system, or the fastest it is possible produce pixels. The right edge 100 indicates the latest that pixels can be rendered and still get the job done without overloading.

Conventional image generators use a double buffered pixel frame buffer so the rendering process can produce pixels anywhere on-screen at any time during the update phase, while the other side of the pixel frame buffer is being sent sequentially to the display. This new invention uses only one pixel frame buffer, and the rendering process and the display process share the same memory. Using a single pixel frame buffer reduces the total amount of memory needed. Since both processes share one buffer, it is important to ensure that each process is operating on a different portion of the screen. The system needs to ensure that pixels are rendered before they are displayed.

Figure 8:
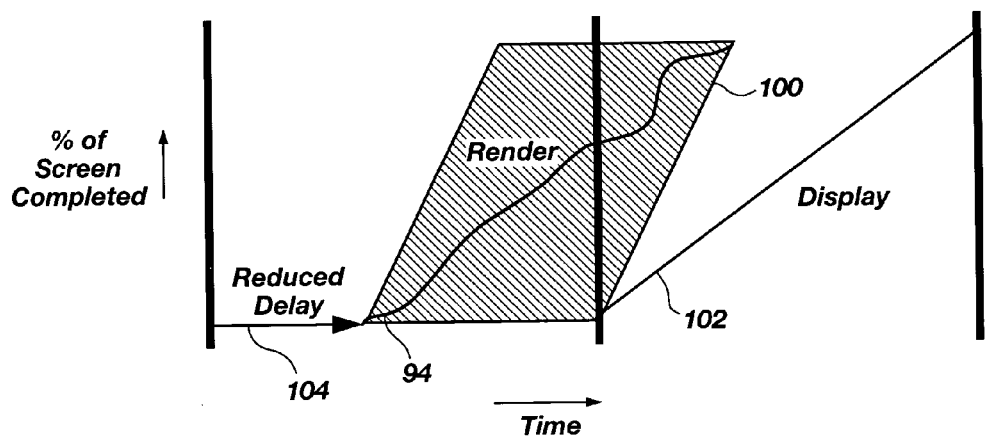
FIG. 8 illustrates a timing diagram of rendering and display processes which produce reduced delay without rendering envelope overlap.

The transport delay can be reduced by adjusting the time between the start of rendering and the start of display, as shown in FIG. 8. In this case, the rendering start time has been adjusted 104 (moved to the right) so that the display process 102 does not overlap the rendering envelope 100. This arrangement is relatively safe. If the rendering process 94 does not overload, then the correct image will always be displayed. However, if the rendering process overloads, the display process may display some pixels that have not been updated yet.

Figure 9:
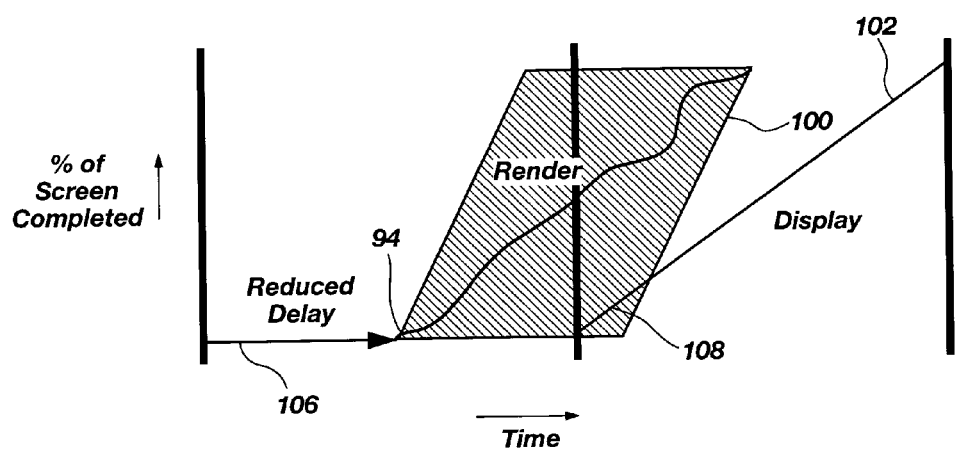
FIG. 9 illustrates a timing diagram of rendering and display processes which produce reduced delay by overlapping a portion of the rendering envelope and a display process.

The transport delay can be further reduced by increasing the risk of displaying bad pixels, as illustrated in FIG. 9. In this case, we have reduced the delay by ½ of a field 106. Note that a portion of the display process 108 overlaps the rendering envelope 100 now, so we have increased our chance of displaying incorrect pixels due to overloading. The further the delay is reduced, the higher the chance of overloading.

Figure 10:
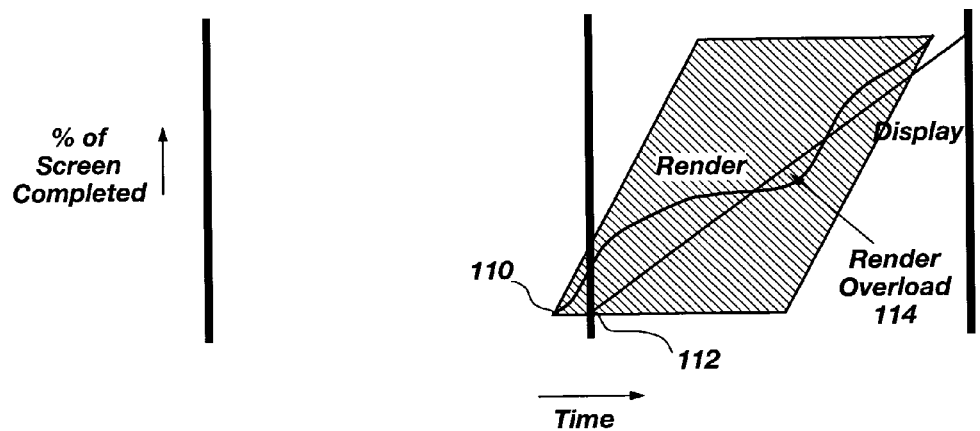
FIG. 10 is a timing diagram of the rendering and display processes with process overlap that produce a rendering overload condition.

FIG. 10 illustrates a condition where the rendering process 110 overloads and is overtaken by the display output 112. The pixels on the screen associated with the portion of the render curve that lie to the right of the display line will not be valid. This problem area is shown as the render overload 114. When running in a simulation mode where a new image is generated each field time, the displayed data will actually be from the previous field. Notice that the rendering process catches back up after overloading, so only a small section of the screen displays old pixels. This will usually appear as the tearing or splitting of polygons in the failing region of the screen. Because the display process cannot be interrupted, it is not possible to guarantee a correct image under all conditions.

Figure 11:
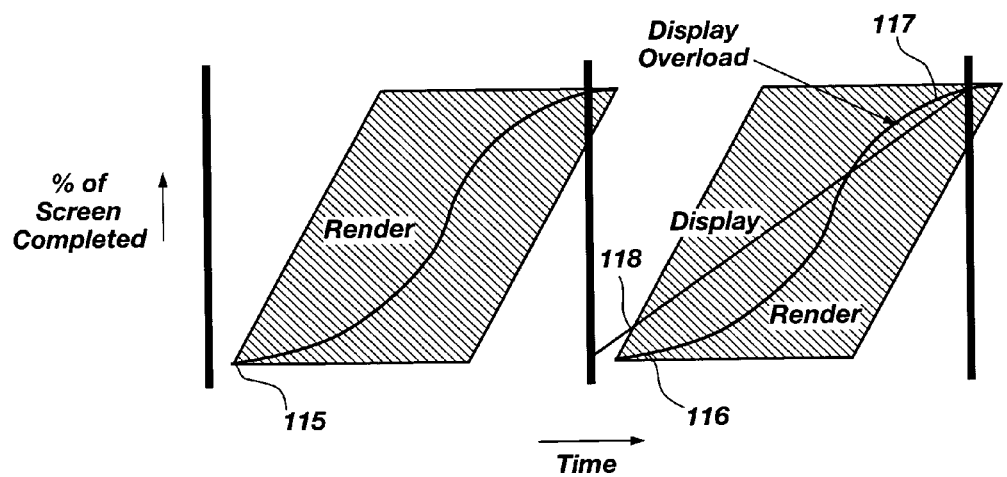
FIG. 11 is a timing diagram of the rendering and display processes with process overlap that produce a display overload condition.

As illustrated in FIG. 11, it is possible to produce another type of failure with this mode of operation. If the rendering of the next field happens too quickly, then pixels are displayed from the next field which also causes a visual tearing that is objectionable. The system tries to display the pixels that were rendered by the left render process 115, but the next field 116 (the right shaded region) catches up to the display process. When the rendering process overtakes the display process 118 as it is trying to display the last frame, new pixels are displayed which produces display overload 117. It is therefore important to find an appropriate balance to keep the display process in between the rendering of two adjacent fields.

A hardware interlock in the system can prevent this display overload from happening. Before a row of bins is rendered, it is possible to compare the current bin row address with the raster line number that is currently being displayed. If the pixels associated with the next row of bins have not already been displayed, simply hold off the rendering process until they have. This interlock is not available in traditional workstations and image generators, but it can be included in a custom-built system.

Figure 12:
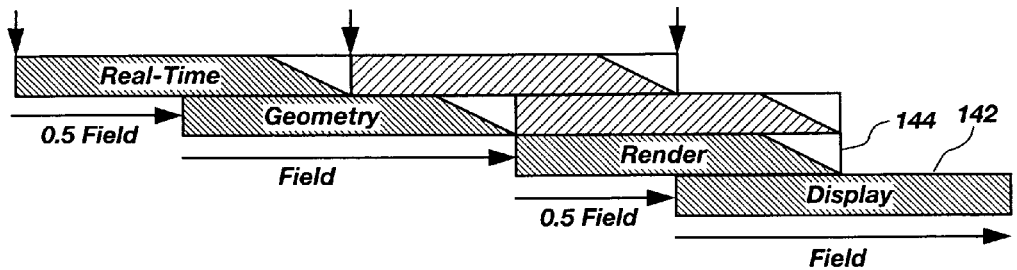
FIG. 12 is a timing diagram of the rendering and display processes with a reduced transport delay.

With appropriate interlocking, it can be seen that at least ½ of a field can be removed from the transport delay by overlapping the display process 142 with the rendering process 144, as shown in FIG. 12. This provides a 3 field delay as opposed to a 3½ field delay found in prior art deterministic systems.

Figure 13:
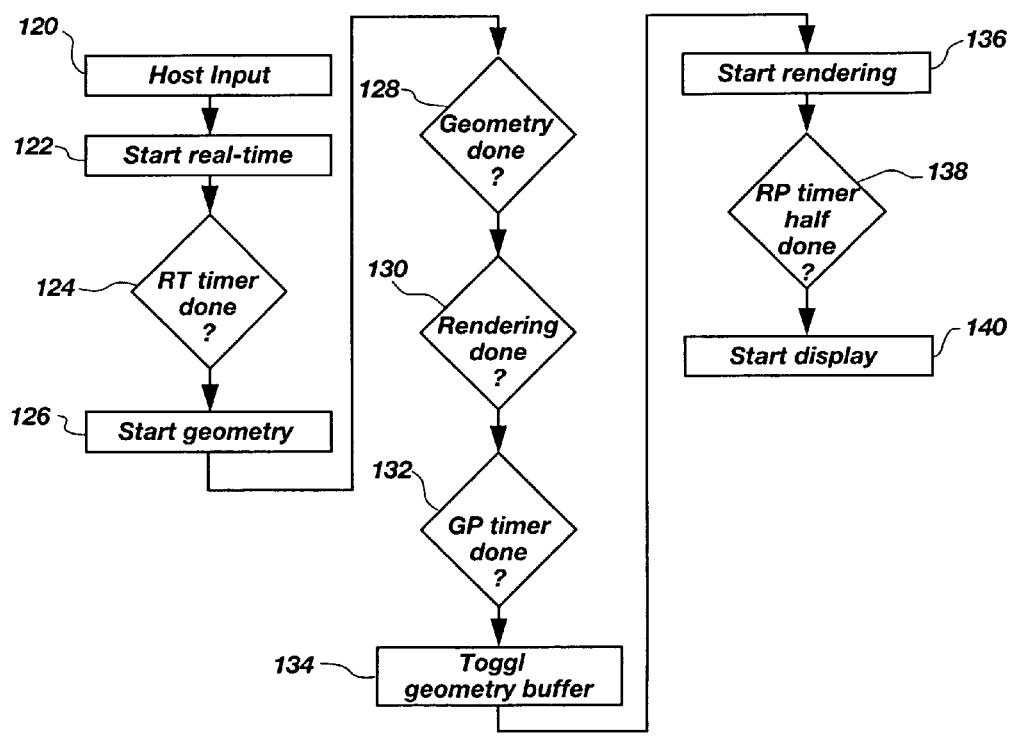
FIG. 13 is a flow diagram for a system with reduced transport delay using single buffered video display.

For comparison, this enhanced process is also illustrated in the flow chart of FIG. 13. Note that with this reduced delay configuration the geometry buffer no longer toggles synchronously with the display vertical pulses, but it requires an independent timer 132. The vertical pulse timer 138 is set to start the display process 140 when the rendering process 136 is about half way through the rendering engine's field time. Also notice that the pixel frame buffer (or video buffer) is now single buffered, so there is no need to toggle the pixel frame buffer. The geometry process 126 still uses a double buffer which is toggled 134 when the independent timer dictates. It is important to point out that the display process can even begin when the rendering process is between ¼ to ¾ complete. This requires separate timing mechanisms or arrangements, but it provides useful embodiments of the invention. The display process can even be set to start when the rendering process has rendered only the first row of screen bins.

An alternative embodiment of the invention utilizes a double buffered pixel frame memory, but the input side and output side of the memory toggle independently. In other words, the rendering process writes into side A during the first field, then side B the next field, and then back to side A. One half a field out of phase (e.g., one half a field behind), the output side displays side A first, then side B, then A. If the rendering falls behind the display process, bad "old" pixels from a previous frame are still displayed, but if rendering gets ahead bad "new" pixels are not displayed. With this approach, when bad "old" pixels are displayed, they are two fields old instead of one. A frame level hardware interlock can also be used to overcome the problem of displaying bad "old" pixels. The display process can check to see if a row has been rendered before it is displayed.

Some simulation applications, such as real-time simulation, benefit from a shorter transport delay as defined in this description even though certain precautions must be taken to avoid the display of incorrect images under overload conditions.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method for enabling a single pixel frame buffer for simultaneous rendering and display in a computer image generator, comprising the steps of:
    (a) dividing a geometry buffer into a plurality of screen bins;
    (b) storing primitives in each screen bin the primitives touch;
    (c) rendering the screen bins by row from top to bottom, into the single pixel frame buffer;
    (d) displaying at least one row of screen bins rendered before the rendering of all the screen bins has completed, wherein the displaying of the screen bins takes place after a selected portion of the screen bins for a current field have been rendered.

2. A method as in claim 1 further comprising the step of reducing the transport delay without allowing the display step to overlap a rendering envelope.

3. A method as in claim 1 further comprising the step of reducing the transport delay and allowing the display step to overlap a rendering envelope.

4. A method as in claim 1 further comprising the step of rendering at least one row of screen bins before the display step begins.

5. A method as in claim 1 further comprising the step of reducing the transport delay by allowing the display step to overlap a rendering envelope without allowing pixels from a previous field to be displayed.

6. A method for enabling a single pixel frame buffer for simultaneous rendering and display in a computer image generator, comprising the steps of:
    (a) dividing a geometry buffer into a plurality of screen bins;
    (b) storing primitives in each screen bin containing a portion of the primitive;
    (c) rendering the screen bins, by row from top to bottom, into the single pixel frame buffer;
    (d) displaying at least one rendered screen bin when the rendering of the screen bins for the single pixel frame buffer is at least ½ completed.

7. A method as in claim 6, further comprising the step of using a hardware interlock to ensure that the rendering step does not advance ahead of the display step.

8. A method as in claim 7, further comprising the step of using a row based hardware interlock to ensure that the rendering step does not advance ahead of the display step.

9. A method as in claim 6, further comprising the step of executing the rendering and displaying steps concurrently within the same frame buffer.

10. A method as in claim 6, wherein step (d) further comprises using an independent timer to control toggling of the geometry buffer.

11. An image generator with a single pixel frame buffer enabled for simultaneous rendering and display, comprising:
    (a) a geometry buffer divided into a plurality of screen bins;
    (b) a plurality of primitives, stored in all of the screen bins that touch a screen region defined by the screen bin;
    (c) a rendering engine, configured to render the primitives in the screen bins into the single pixel frame buffer by row and from top to bottom;
    (d) a display processor, configured to display at least one rendered screen bin on a display screen before the rendering engine has completed rendering all the screen bins;
    (e) wherein the display processor begins to display the screen bins rendered when the rendering of the screen bins is at least ½ complete.

12. An image generator as in claim 11, further comprising a geometry engine configured to transform a database and the plurality of primitives used by the image generator.

13. An image generator as in claim 11, further comprising a real-time controller configured to receive real-time control information and compute transformation matrices.

* * * * *